United States Patent Office 3,505,250
Patented Apr. 7, 1970

3,505,250
POLYURETHANE PLASTICS
James H. Saunders, Bridgeville, Pa., assignor to Mobay Chemical Company, Pittsburgh, Pa., a corporation of Delaware
No Drawing. Filed Sept. 8, 1966, Ser. No. 577,841
Int. Cl. C08g 22/08
U.S. Cl. 260—2.5                    9 Claims

ABSTRACT OF THE DISCLOSURE

A polyurethane plastic prepared from a reaction mixture containing an organic polyisocyanate, an organic compound containing at least two hydrogen atoms reactive with isocyanate groups and a mixture of polymerized fatty acids obtained by the dimerization of unsaturated fatty acids.

---

This invention relates to polyurethane plastics and more particularly, to novel combinations of polyurethane plastics with modifiers and/or extenders which do not deleteriously affect the physical properties of the polyurethane but, in many instances, actually enhance them.

Polyurethane plastics including moldings, castings, coatings, caulks, sealants, putties, adhesives, cellular polyurethane plastics and the like obtained from an organic polyisocyanate and an hydroxyl bearing material such as an hydroxyl polyester are well known. They have excellent physical properties and resistance to chemicals. When such polyurethanes are filled with nonreactive fillers the resulting products have not proven entirely satisfactory because in most cases the physical properties suffer proportionately with the amount of filler.

Moreover, in polyurethane systems formulated at a given—NCO/active hydrogen ratio, it has heretofore not been practical to use a reactive or potentially reactive filler because the added material would upset the —NCO to active hydrogen balance and yield undesirable products. Further, if the filler contains only one active hydrogen atom per molecule it may act as a chain stopper and, therefore, could be expected to greatly decrease the desirable properties of the polymer, particularly the tensile strength, elongation an tear strength. In this regard, especially substances containing carboxylic acid groups have been avoided because the NCO/COOH reaction produces carbon dioxide which can become entrapped in the forming polyurethane to yield a product weakened by a porous structure. Where such products are desired, this is of no consequence, but pores cannot be tolerated in the production of substantially nonporous polyurethane plastics.

In Australian Patent 205,456 the use of 20 percent to 80 percent by weight of liquid inert plasticizers having boiling points above about 200° C. has been proposed. In accordance with that process, the inert liquid is added to a reactant prior to the preparation of the final polyurethane product to make the product more flexible. While the products are more flexible when the plasticizer is included, they suffer a proportionate loss in tensile strength, elongation and tear strength. Further, the use of materials as extenders such as tall oil, for example, leads to problems with regard to closed cells and shrinkage in the foam product.

It is therefore an object of this invention to provide a filler or inert extender for polyurethane plastics which is devoid of the foregoing disadvantages.

A further object of this invention is to provide a filled or extended polyurethane plastic of improved properties.

Another object of this invention is to provide a filled polyurethane plastic which possesses no significant loss in many physical properties due to the filler being used, while at the same time a desirable plasticizing effect is imparted to the formulation.

Still another object of the invention is to provide a process for the production of polyurethane plastics which employs less expensive constituents than those used heretofore.

Yet another object of the invention is to provide a filler or extender for a polyurethane plastic which may be used in greater proportions in the polyurethane formulation than were heretofore used without adversely affecting the properties of the product, which contains groups reactive with NCO groups and which, at the same time, does not interfere with the NCO/active hydrogen reaction.

Still further, the invention seeks to provide all types of polyurethane plastic products including both porous and nonporous products containing an improved modifier or filler which enhances the physical properties thereof, and a process for the production of same.

The foregoing objects and others which will become apparent from the following description are accomplished in accordance with this invention, generally speaking, by providing as a filler or extender for all types of polyurethane formulations, a mixture of polymerized fatty acids obtained by the dimerization of unsaturated fatty acids. The invention contemplates a unique polyurethane product containing the mixture of acids obtained by the dimerization of unsaturated fatty acids and process for the preparation thereof as well as the unique concept that such materials may function as nonreactive extenders in polyurethane formulations. Preferably, a maximum of about 50 percent or less by weight of the reaction mixture of polymerized fatty acids is used, but greater amounts may be used for some applications. Moreover, it is preferred to include at least about 10 percent by weight of the mixture of polymerized fatty acids in the reaction mixture although the invention also contemplates lower concentrations of down to about one percent by weight or less of the mixture of polymerized fatty acids in the product.

The process and product of the invention are to be distinguished from the modification of dimeric acids into esters or esterified forms which are then reacted with an organic polyisocyanate to yield a urethane. Such processes are disclosed in U.S. Patents 3,173,887 and 2,642,403. In the described processes, a dimeric acid is converted first into a polyester and is then reacted into the polyurethane product by means of hydroxyl groups added to the acid by conventional esterification procedures or by making it part of a complex polyester which is then itself reacted with the isocyanate. As distinguished from such processes, the instant invention involves the incorporation of polymerized fatty acids as obtained from the dimerization of unsaturated fatty acids into a polyurethane plastic in substantially unmodified form. It was expected that the dimerized acid reaction mixture which possesses a high acid number would react rapidly with any free isocyanate groups to yield a non-uniform cellular mass through the evolution carbon dioxide. It was found, however, that the polymerization reaction could be controlled so that, if desired, the acid mixture does not react appreciably, or it can be made to react, but in either case it does not interfere significantly with the polymerization, and even enhances and improves certain properties of the polyurethane.

The term "mixture of polymerized fatty acids" as used herein and in the appended claims designates an unpurified substance obtained from the dimerization of unsaturated fatty acids. In the dimerization reaction a mixture of monomer, dimer and trimer acids occur to yield a composition and properties which are preferably within approximately the following ranges:

Acid number (mg. KOH/gram)—160
Equivalent weight—352
Unsaponifiable materials—3.0% max.
Color—Dark
Viscosity—6,000 cps. at 26° C.
Monomer acid content—10%–20%
Dimer acid content—40%–50%
Trimer acid content—35%–45%

The polymerized fatty acids heretofore mentioned can be obtained from a dimerization reaction wherein an unsaturated fatty acid is heated at a high temperature. For example, a dimer acid can be obtained by combining two molecules of an unsaturated fatty acid, such as, for example, linoleic acid, in the presence of alkali, to form dibasic acids contaminated with some tribasic acids and monomers, Any suitable unsaturated acid can be used to prepare the mixture of polymerized fatty acids for use as a modifier such as, for example, sorbic acid, geranic acid, palmitolic acid, linoleic acid, humoceric acid, eicosinic acid and the like and mixtures thereof.

It has been found that the inclusion of the acid mixture defined herein in the polyurethane reaction mixture results in several unexpected and advantageous results. In the first place, the acid mixture functions as an inexpensive extender or filler for the polyurethane being formed without correspondingly decreasing many desirable properties of the polyurethane. Further, because of the very high molecular weight of the polymerized fatty acid mixture, and its more complex structure, the inclusion of these materials as fillers or extenders yields a polyurethane plastic with improved dimensional stability, even over those prepared using tall oil as an extender, for example. In addition, the mixture of polymerized fatty acids is viscous compared to tall oil, for example, and thus, although it imparts some plasticizing effect to the polyurethane plastic being formulated, the plasticizing effect is much less than that contributed by less viscous materials; as a consequence, the polyurethane product suffers a correspondingly smaller decrease in tear strength, dimensional stability and elongation. A further consequence of the higher molecular weight of the polymerized fatty acid mixture as fillers or extenders for polyurethane plastics is that they possess a lower volatility and consequently a higher degree of permanence, insuring that the polyurethane will not yield the filler to the atmosphere after a year or so of use, thus becoming gradually degraded. In addition, the mixtures of polymerized fatty acids, particularly as described herein, have no significant odor and due to their high molecular weight and low volatility, no detectable odor is imparted to finished polyurethane products. On the other hand, other fillers such as tall oil and the like have a high volatility accompanied by a strong and undesirable odor which is imparted to the polyurethane product and makes their use decidedly disadvantageous.

The mixture of polymerized acids as described herein contribute markedly to the hydrolytic stability of the polyurethane product and makes them moisture resistant. This attribute is especially important when a polyester polyurethane is being prepared since the acid extender of this invention helps to stabilize the ester linkage against the hydrolytic ravages of moisture. Even the hydrolytic stability of a polyether foam which is not given to hydrolytic cleavage can be improved with the use of the acid mixture set out herein. It is also irrelevant in what form the polyurethane composition will ultimately be used since the acid mixture will exert all of the foregoing effects equally well in either a cellular or noncellular polyurethane including polyurethane coatings, caulks, sealants, adhesives, films, fibers, either flexible or rigid foams, and the like.

Any suitable organic polyisocyanate may be used in the process of the present invention including aromatic, aliphatic and heterocyclic polyisocyanates. in other words, two or more isocyanate radicals may be bonded to any suitable divalent or higher polyvalent organic radical to produce the organic polyisocyanates which are useful in accordance with the present invention including acyclic, alicyclic, aromatic and heterocyclic radicals. Suitable organic polyisocyanates are, therefore, ethylene diisocyanate, ethylidene diisocyanate, propylene-1,2- diisocyanate, cyclohexylene-1,2-diisocyanate, m-phenylene diisocyanate, 2,4-toluylene diisocyanate, 1,6-toluylene diisocyanate, 3,3'-dimethyl-4,4'-biphenylene diisocyanate, 3,3'-dimethoxy- 4,4' - biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is preferred to use the commercially available mixture of toluylene diisocyanates which contains 80 percent 2,4-toluylene diisocyanate and 20 percent 2,6-toluylene diisocyanate or 4,4'- diphenylmethane diisocyanate.

Any suitable organic compound containing at least two active hydrogen containing groups as determined by the Zerewitinoff method, said groups being reactive with an isocyanate group, may be reacted with an organic polyisocyanate in the presence of the mixture of polymerized fatty acids in accordance with the process of the present invention. The active hydrogen atoms are usually attached to oxygen, nitrogen or sulphur atoms. Thus, suitable active hydrogen containing groups as determined by the Zerewitinoff method which are reactive with an isocyanate group include —OH, —NH$_2$, —NH—, —COOH, —SH and the like. Examples of suitable types of organic compounds containing at least two active hydrogen containing groups which are reactive with an isocyanate group are hydroxyl polyesters, polyhydric polyalkylene ethers, polyhydric polythioethers, polyacetals, aliphatic polyols, including alkane, alkene and alkyne diols, triols, tetrols, and the like, aliphatic thiols including alkane, alkene and alkyne thiols having two or more —SH groups; polyamines including both aromatic, aliphatic and heterocyclic diamines, triamines, tetramines and the like; as well as mixtures thereof. Of course, compounds which contain two or more different groups within the above-defined classes may also be used in accordance with the process of the present invention such as, for example, amino alcohols which contain an amino group and an hydroxyl group, amino alcohols which contain two amino groups and one hydroxyl group and the like. Also, compounds may be used which contain one —SH group and one —OH group or two —OH groups and one —SH group as well as those which contain an amino group and a —SH group and the like.

The molecular weight of the organic compound containing at least two active hydrogen containing groups is not critical. Preferably, however, at least one of the organic compounds containing at least two active hydrogen containing groups which is used in the production of the polyurethane plastic has a molecular weight of at least about 200 and preferably between about 500 and about 5000 with an hydroxyl number within the range of from about 25 to about 800 and acid numbers, where applicable, below about 5. A satisfactory upper limit for the molecular weight of the organic compound containing at least two active hydrogen containing groups is about 10,000 but this limitation is not critical so long as satisfactory mixing of the organic compound containing at least two active hydrogen containing groups with the organic polyisocyanate and polymerized fatty acids can be obtained. In addition to the high molecular weight organic compound containing at least two active hydrogen containing groups, it is desirable to use an organic compound of this type having a molecular weight below about 750 and preferably below about 500. Aliphatic diols and triols are most preferred for this purpose.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, a-hydromuconic acid, b-hydromuconic acid, a-butyl-a-ethyl-glutaric acid, a-b-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexane-dicarboxylic acid, 3,4,9,10-perylenetetracarboxylic acid and the like. Any suitable polyhydric alcohol may be used such as, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerine, trimethylol propane, 1,3,6-hexanetriol, triethanolamine, pentaerythritol, sorbitol and the like.

Any suitable polyhydric polyalkylene ether may be used such as, for example, the condensation product of an alkylene oxide or of an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols , polybutylene ether glycols and the like. It is often advantageous to employ some trihydric or higher polyhydric alcohol such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7 pp. 257–262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

The hydroxyl polyester may also be a polyester amide such as is obtained, for example, by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl polyester with only a portion of the components being a diamine such as ethylene diamine and the like.

Any suitable polyacetal may be used, such as, for example, the reaction product of formaldehyde or other suitable aldehydes with a polyhydric alcohol such as those disclosed above for use in the preparation of the hydroxyl polyesters.

Any suitable aliphatic polyol may be used such as, for example, alkane diols such as, for example, ethylene glycol, 1,3-propylene glycol, 1,2-propylene glycol, 1,4-butylene glycol, 1,3-butylene glycol, 1,5-pentane diol, 1,4-butane diol, 1,3-pentane diol, 1,6-hexane diol, 1,7-heptane diol, 2,2-dimethyl-1,3-propane diol, 1,8-octane diol and the like including 1,20-eicosane diol and the like; alkene diols such as, for example, 1-butene-1,4-diol, 1,3-butadiene-1,4-diol, 2-pentene-1,5-diol, 2-hexene-1,6-diol, 2-heptene-1,7-diol and the like; alkyne diols such as, for example, 2-butyne-1,4-diol, 1,5-hexadiyne, 1,6-diol and the like; alkane triols such as, for example, 1,3,6-hexane-triol, 1,3,7-heptane triol, 1,4,8-octane triol, 1,6,12-dodecane triol and the like; alkene triols such as, 1-hexene-1,3, 6-triol and the like; alkyne triols such as, 2-hexyne-1,3,6-triol and the like; alkane tetrols such as, for example, 1,2,5,6-hexane tetrol and the like; alkene tetrols such as, for example, 3-heptene-1,2,6,7-tetrol and the like; alkyne tetrols such as, for example, 4-octyne-1,2,7,8-tetrol and the like.

Any suitable aliphatic thiol including alkane thiols containing two or more —SH groups may be used such as, for example, 1,2-ethane dithiol, 1,2-propane dithiol, 1,3-propane dithiol, 1,6-hexane dithiol, 1,3,6-hexane trithiol and the like; alkene thiols such as, for example, 2-butene-1,4-dithiol and the like; alkyne thiols such as, for example, 3-hexyne-1,6-dithiol and the like.

Any suitable polyamine may be used including for example, aromatic polyamines such as, for example, p-amino aniline, 1,5-diamino naphthalene, 2,4-diamino toluylene, 1,3,5-benzene triamine, 1,2,3-benzene triamine, 1,4,5,8-naphthalene tetramine and the like; aliphatic polyamines such as, for example, ethylene diamine, 1,3-propylene diamine, 1,4-butylene diamine, 1,3-butylene diamine, diethyl triamine, triethylene tetramine, 1,3,6-hexane triamine, 1,3,5,7-heptane tetramine and the like; heterocyclic polyamines such as, for example, 2,6-diamino pyridene, 2,4-diamino 5-aminomethyl pyrimidine, 2,5-diamino-1,3,4-thiadiazol and the like.

Other alcohol compounds which do not necessarily fit within any of the previously set forth classes of compounds and which nevertheless contain active hydrogen containing groups which are quite suitable for the production of the polyurethane plastics of the present invention are pentaerythritol, sorbitol, triethanolamine, mannitol, N,N,N',N'-tetrakis(2-hydroxypropyl)ethylene diamine, as well as compounds of any of the classes set forth above which are substituted with halogen such as, for example, chloro, iodo, bromo and the like; nitro; alkoxy, such as, for example, methoxy, ethoxy, propoxy, butoxy and the like; carboalkoxy such as, for example, carbomethoxy, carbethoxy and the like; dialkyl amino such as, for example, dimethyl amino, diethyl amino, dipropyl amino, methylethyl amino and the like; mercapto, carbonyl, thiocarbonyl, phosphoryl, phosphato and the like.

The process of the invention comprises mixing an organic polyisocyanate with an organic compound containing at least two active hydrogen containing groups as determined by the Zerewitinoff method, said groups being reactive with an isocyanate group in the presence of a mixture of polymerized fatty acids as defined hereinbefore. There is no critical order of addition, reaction temperature of reaction time involved in this simple and convenient process. However, best results are obtained when the polymerized fatty acids are mixed with an organic compound containing at least two active hydrogen containing groups as set forth above prior to combination with the organic polyisocyanate. When the polymerized fatty acids are mixed with the organic polyisocyanate in a first step it shows more tendency to react than where the isocyanate has available for reaction an organic compound containing at least two active hydrogen containing groups which are reactive with an isocyanate group to yield a polyurethane plastic. Moreover, a preferred embodiment of the invention involves the reaction of one of the organic compounds containing at least two active hydrogen containing groups with an excess of an organic polyisocyanate in a first step to prepare an isocyanato-terminated prepolymer and then reacting said prepolymer with an organic compound containing at least two active hydrogen containing groups in the presence of a mixture of polymerized fatty acids. The preferred excess is sufficient to provide an —NCO to active hydrogen ratio between about 1.5 and 5. Preferably the organic compound containing at least two active hydrogen containing groups which is used in the formation of the isocyanato-terminated prepolymer has a molecular weight above about 500 and an hydroxyl number within the range of from about 25 to about 600 and an acid number, where applicable, below about 15 and most preferably below about 3. The organic compound containing at least two active hydrogen containing groups which is employed in the second step for reaction with the isocyanato-terminated prepolymer may be any of the organic compounds disclosed above and preferably has a molecular weight of up to about 5000. Monomeric aliphatic diols such as, 1,4-butane diol, 1,3-butane diol and the like or a polyhydric alcohol such as castor oil, N,N,N',N'-tetrakis(2-hydroxy propyl)ethylene diamine, bis-b-hydroxy ethylene diamine and the like are suitable.

A preferred embodiment of this invention involves the production of substantially nonporous polyurethane plastics by the reaction of an organic polyisocyanate with at least a stoichiometric amount of an organic compound containing at least two active hydrogen containing groups as determined by the Zerewitinoff method, said groups being reactive with an —NCO group, in the presence of the mixture of polymerized fatty acids. Thus, the polymerized fatty acids may be mixed with an organic compound essentially nonreactive therewith containing at least two active hydrogen containing groups as determined by the Zerewitinoff method and stored for a period of time prior to combination with either a monomeric organic polyisocyanate or an isocyanato-terminated prepolymer. This makes it possible to produce a two component system for the production of substantially nonporous polyurethane plastics including castings, coatings, moldings and the like. In the production of the nonporous polyurethane plastics, in accordance with this preferred embodiment of the invention, the —NCO to active hydrogen ratio is preferably within the range of from about 0.75 to about 1.0. It is preferred to mix the polymerized fatty acids with an organic compound which is essentially nonreactive therewith at temperatures up to about 120° F. Suitable compound which may be mixed with the polymerized fatty acids and stored at temperatures up to about 120° F. are those which contain terminal —OH, —SH and the like groups. One should avoid mixing the polymerized fatty acids with either a primary or secondary amine even at room temperature because the amino compounds will react with the polymerized fatty acids to yield products which will adversely affect the physical properties of the polyurethane plastic. Still further, in order to minimize side reactions in the production of substantially nonporous polyurethane plastics it is desirable to maintain the temperature of the reaction components below about 100° C. The exotherm of the reaction mixture is usually below about 100° C. and therefore no cooling of the reaction mixture is necessary. In cases where amine-containing reactive compounds are used the amine-containing reactive compound, the polymerized fatty acids and polyisocyanate may be mixed simultaneously.

The process of the invention can be used for the preparation of castings, moldings and coating compositions including for example, caulks, sealants, putties, adhesives and surface coatings. Castings are prepared by mixing either a monomeric organic polyisocyanate or the above-described isocyanato-terminated prepolymer with an organic compound containing active hydrogen containing groups which are reactive with an isocyanate group, polymerized fatty acids being included in the reaction mixture, preferably under substantially anhydrous conditions and preferably in an amount which corresponds to from about 10 percent to about 50 percent by weight of the final casting. Best results are obtained when an isocyanate-modified organic compound is reacted with an hydroxyl bearing organic compound having a molecular weight between about 90 and about 2000 and an hydroxyl number between about 56 and about 940. Thus, for the production of hard, rigid materials one may use low molecular weight compounds having higher functionality based on hydroxyl groups and for flexible materials one may use high molecular weight compounds with lower functionality based on hydroxyl groups. The resulting composition may be employed as a caulk, sealant or a putty for many useful applications. The composition has properties which are comparable to those obtained from the unfilled polyurethane plastic. Indeed, in many instances the physical properties of the casting are improved with regard to tensile strength and elongation. Excellent results are obtained from the reaction of an aromatic diisocyanate such as a mixture of 80 percent 2,4- and 20 percent 2,6-toluylene diisocyanate with an hydroxyl polyester, a polyhydric polyalkylene ether or polyhydric polythioether having two to four terminal hydroxyl groups in a first step to prepare an isocyanate-modified prepolymer and then reacting the resulting product with a mixture containing approximately the stoichiometric amount of polyol, having from two to six hydroxyl groups, necessary to react with all of the terminal —NCO groups, polymerized fatty acids having from about 10 percent to about 20 percent monomeric acids from about 40 percent to about 50 percent dimeric acids and from about 35 percent to about 45 percent trimeric acids, being included in the reaction mixture in the second step. This polymerized acid mixture preferably constitutes from about 10 percent to about 50 percent by weight of the final product.

In accordance with another embodiment of the invention moldings can be prepared by reacting the organic polyisocyanate with an organic compound containing at least two active hydrogen containing groups in a kneader or other suitable mixing device, the mixture of polymerized acids being incorporated into the reaction mixture in the kneader to obtain a crumbly mass which is then further reacted with an organic polyisocyanate, a polyamine, a polyol, water or other suitable cross-linking agent on a rubber mill and finally pressed into a mold and allowed to cure. Alternately, the crumbly mass may be prepared by reaction between the organic polyisocyanate and the organic compound containing at least two active hydrogen containing groups in the mixer and then the mixture of polymerized acids may be incorporated into the mixture on the rubber mill and finally pressed into a mold. Suitable processes for carrying out this type of reaction may be found in U.S. Patents 2,621,166 and 2,900,368.

Coating compositions can be prepared by reacting an organic polyisocyanate or isocyanate-modified prepolymer as described above with an organic compound containing at least two active hydrogen containing groups, if desired, in an inert organic solvent therefor, said reaction mixture leading to the production of said coating composition containing a mixture of polymerized fatty acids and preferably not more than about 50 percent by weight of the mixture of polymerized fatty acids. Any suitable inert organic solvent may be used such as, for example, xylene, ethyl acetate, toluene, ethylene glycol monoethylether acetate and the like. The resulting coating composition can be applied in any suitable fashion such as, for example, dipping, brushing, roller coating and the like, but it is preferably applied by spraying it onto the substrate. Any suitable substrate may be coated with the coating compositions of the invention such as, for example, wood, paper, porous plastics, such as, for example, sponge rubber, cellular polyurethane plastics, foamed polystyrene and the like as well as metals such as steel, aluminum, copper and the like. The coating composition need not contain a solvent for all applications. The coating composition of the invention may contain any suitable pigment such as, for example, iron oxide, carbon black, titanium dioxide, zinc oxide, chrome green, lithol red and the like. Flexible, chemically resistant coatings are obtained in accordance with the process of the invention. The coating compositions can also be used as adhesives in accordance with the present invention by applying the coating composition to a substrate to be bonded. No serious loss in adhesive strength results from the use of the mixture of polymerized fatty acids in conjunction with the organic polyisocyanate and organic compound containing active hydrogen as an adhesive.

The polymerized fatty acids may also be included in the reaction components leading to the production of cellular polyurethane plastics in accordance with any of the heretofore known processes for the production of cellular polyurethane plastics. Suitable processes for the preparation of cellular polyurethane plastics are disclosed in U.S. Reissue Patent 24,514 together with suitable machinery to be used in conjunction therewith. The mixture of polymerized fatty acids is preferably mixed with the organic compound containing at least two active hydrogen containing groups which is then reacted with an organic polyisocyanate and water to produce a cellular polyurethane plastic. In this embodiment of the invention it is preferred to cause the polymerized fatty acids to react with the organic polyisocyanate to generate carbon dioxide in addition to that generated by the $NCO/H_2O$ reaction and become chemically combined with the other components. The exotherm of the reaction mixture leading to the production of cellular polyurethane plastics is usually sufficient to cause reaction between the polymerized fatty acids and the organic polyisocyanate since temperatures above about 110° C. are usually sufficient. If a blowing agent such as a halohydrocarbon including, for example, dichlorodifluoromethane, trichlorofluoromethane or the like is included in the reaction mixture the water may be eliminated. It is noted here that whenever the polymerized fatty acids are induced to become polymerized into the polyurethane structure, an additional advantage is obtained in the polyurethane being formed in that heat stability is added. The unsaturated ethylene-containing compounds that become part of the polymer by addition polymerization impart the property of heat stability to the polymer, probably by means of the linkage formed between the ethylenically unsaturated mixture of polymerized fatty acids and the NCO group of the isocyanate.

Either the prepolymer referred to above may be reacted with water in the presence of the mixture of polymerized fatty acids to produce a cellular polyurethane plastic or the organic polyisocyanate may be reacted with an organic compound containing at least two active hydrogen containing groups which are reactive with NCO groups as determined by the Zerewitinoff method, to prepare a cellular polyurethane plastic in a one-step procedure.

It is often advantageous in the production of cellular polyurethane plastics to include other additives in the reaction mixture such as, for example, emulsifiers, foam stabilizers, coloring agents, fillers and the like. It is particularly advantageous to employ an emulsifier such as, for example, sulphonated castor oil and/or a foam stabilizer such as a silicone oil such as, for example, a polydimethyl siloxane or an alkyl silane polyoxyalkylene block copolymer. The latter type of silicone oil is disclosed in U.S. Patent 2,834,748. Where polyhydric polyalkylene ethers are included in the reaction mixture to prepare a cellular polyurethane plastic, it is preferred to employ a silicone oil of the above patent within the scope of the formula:

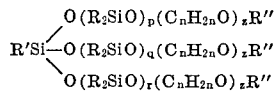

wherein R, R' and R'' are alkyl radicals having 1 to 4 carbon atoms; $p$, $q$ and $r$ each have a value of from 4 to 8 and $(C_nH_{2n}O)_z$ is a mixed polyoxyethylene oxypropylene group containing from 15 to 19 oxyethylene units and from 11 to 15 oxypropylene units with $z$ equal to from about 26 to about 34. Most preferred is a compound having the formula:

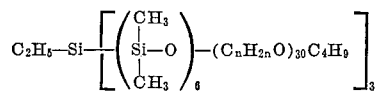

wherein $(C_nH_{2n}O)$ is a mixed polyoxyethylene and oxypropylene block copolymer containing about 17 oxyethylene units and about 13 oxypropylene units.

It is preferred to include a catalyst in the reaction mixture leading to the production of the cellular polyurethane plastics. Suitable catalysts are, for example, tertiary amines, such as, for example, triethylene diamine, N-methyl morpholine, N-ethyl morpholine, diethyl ethanolamine, N-coco morpholine, 1-methyl-4-dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are for example, tin compounds such as, stannous chloride, tin salts of carboxylic acids, such as dibutyl tin di-2-ethyl hexoate, tin alcoholates such as stannous octoate, as well as other organo metallic compounds such as are disclosed in U.S. Patent 2,846,408 and in copending application Ser. No. 835,450.

Another advantageous feature of the invention is that when castings are prepared in accordance with the process set forth above, the demolding time is decreased so that assembly lines which use the caulks and sealants of the invention need not provide for long storage periods following injection of the casting mixture into a mold. Demolding time can be further decreased by including a divalent tin salt of a carboxylic acid or divalent tin alcoholate in the reaction mixture such as, for example, stannous octoate, stannous oleate and the like. Preferably not more than about one percent by weight of the catalyst is used and usually amounts below about 0.25 percent by weight are sufficient.

The products of the present invention are useful for the production of both sound and thermal insulation, gaskets, the potting of electrical components, bushings, the molding of the counter portion of shoes, shoe heels and the like.

The invention is further illustrated by the following examples in which the parts are by weight unless otherwise indicated.

EXAMPLE 1

(A) About 50 parts of a mixture of polymerized fatty acids as described herein and about 35 parts of butanediol are added to about 500 parts of a prepolymer having terminal NCO groups and prepared from polyethylene adipate and 4,4'-diphenylmethane diisocyanate at an NCO/OH ratio of 6.5. The system is cast and cured at about room temperature. The elastomeric product formed is demolded after about 30 minutes.

(B) A second sample is prepared using the foregoing formulation but substituting tall oil for the mixture of polymerized fatty acids. The physical properties of the samples obtained are as follows:

|  | Elastomer A | Elastomer B |
|---|---|---|
| Tensile Strength, lb./in. ASTM D412-62T | 2,580 | 2,707 |
| Elongation, Percent ASTM D412-62T | 600 | 459 |
| Hardness, Shore A | 83 | 70 |
| Tear Strength, lb./in. FTMS-601, pre-notched before test | 265 | 107 |

EXAMPLE 2

(A) A rigid foam is prepared from about 75 parts of the mixture of polymerized fatty acids described herein, about 25 parts of N,N',N'',N'''-tetrakis(2-hydroxypropyl) ethylene diamine, about 2 parts of a silicone copolymer stabilizer, about 1 part of tetramethyl butanediamine, about 35 parts of trichlorofluoromethane and about 78 parts of crude 4,4'-diphenylmethane diisocyanate.

(B) A rigid foam is prepared from about 75 parts of crude tall oil, about 25 parts of N,N',N'',N'''-tetrakis-(2-hydroxypropyl)-ethylene diamine, about 1 part of a silicone copolymer stabilizer, about 25 parts of trichlorofluoromethane and about 70 parts of crude 4,4'-diphenylmethane diisocyanate. The physical properties of the samples obtained are as follows:

|  | Foam A | Foam B |
|---|---|---|
| Density, lb./cu. ft. | 1.5 | 2.2 |
| Compression strength at yield, p.s.i. | 11.7 | 15 |
| Dimensional Stability, Vol. change, percent, 24 hrs.: |  |  |
| 70° C./100% r.h. | 0 | 0 |
| −40° C., ambient humidity | 0 | 0 |

EXAMPLE 3

About 25 parts of the mixture of polymerized fatty acids as described herein are mixed with about 75 parts of a polyhydric polyalkylene ether obtained from sorbitol and propylene oxide having a molecular weight of about 650 and an hydroxyl number of about 562 and then combined with about 70 parts of a mixture of 80 percent, 2,4- and 20 percent 2,6-toluylene diisocyanate, about 0.2 part of stannous octoate, about 0.9 part of N,N,N',N'-tetramethyl-1,3-butane diamine, about 1 part of a silicone oil having the formula

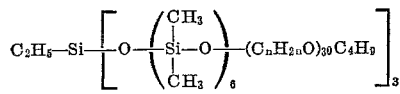

wherein ($C_nH_{2n}O$) is a mixed polyoxyethylene and oxypropylene block copolymer containing about 17 oxyethylene units and about 13 oxypropylene units, and about 20 parts of trichlorofluoromethane in a machine mixer as disclosed in U.S. Reissue Patent 24,514. The resulting mixture is allowed to flow into a cardboard container where gas evolution and foaming takes place to produce a cellular polyurethane plastic. The mixture begins to foam as evidenced by gas evolution shortly after the time that the reaction mixture is allowed to flow into the mold. The cellular polyurethane plastic produced has a density of about 1.6 lbs./cu. ft. and has good load bearing properties.

EXAMPLE 4

About 50 parts of the mixture of polymerized fatty acids as described herein are mixed with about 50 parts of N,N,N',N'-tetrakis(2-hydroxyethyl)ethylene diamine and then combined with about 53 parts of the mixture of toluylene diisocyanates employed in Example 4, about 0.4 part of stannous octoate, about 2 parts of N,N,N',N'-tetramethyl-1,3-butane diamine, about 1 part of the silicone oil employed in Example 4 and about 20 parts of trichlorofluoromethane in a machine mixer as described in U.S. Reissue Patent 24,514. The resulting polyurethane plastic shows no shrinkage due to a partially open-celled structure. The rigid cellular polyurethane plastic has a density of about 1.7 lbs./cu. ft.

EXAMPLE 5

About 146 parts of a mixture of 80 percent 2,4- and 20 percent 2,6-toluylene diisocyanate are mixed with about 164 parts of a polyhydric polyalkylene ether having a molecular weight of about 720 and an hydroxyl number of about 240, about 73 parts of N,N,N',N'-tetrakis(2-hydroxy propyl)ethylene diamine and about 383 parts of a mixture of polymerized fatty acids as described herein substantially simultaneously. The resulting plastic has a tensile strength of about 2420 lbs./sq. in. and a Shore A hardness of about 80.

EXAMPLE 6

About 46 parts of a prepolymer prepared by reacting about 246 parts of a polyhydric polyalkylene ether obtained from 1,2,6-hexanetriol and propylene oxide and having an hydroxyl number of about 240 and a molecular weight of about 720 with about 216 parts of a mixture of 80 percent 2,4- and 20 percent 2,6-toluylene diisocyanate are mixed with about 21 parts of a polyalkylene ether triol obtained from trimethylol propane and propylene oxide and having a molecular weight of about 418 and an hydroxyl number of about 404 and about 100 parts of iron oxide in xylene to provide a mixture containing about 50 percent solids. This mixture is coated onto a piece of cellular polyurethane plastic and a red chemically resistant coating is obtained.

It is to be understood that any of the components and conditions mentioned as suitable herein can be substituted for its counterpart in the foregoing examples and that although the invention has been described in considerable detail in the foregoing, such detail is solely for the purpose of illustration. Further, the concept disclosed herein is applicable to mixtures of polymerized fatty acids derived from unsaturated fatty acids having at least one unsaturated bond and mono-, di-, tri-, tetra- and higher unsaturated fatty acids are all contemplated. Furthermore, lower molecular weight fatty acids may also be used such as, for example, acrylic acid, crotonic acid and the like to prepare the mixture polymerized fatty acids, and all such low, intermediate and high molecular weight unsaturated fatty acids are contemplated. Some specific examples of some fatty acids from which the mixture of polymerized fatty acids of this invention may be made are, for example, oleic acid, methacrylic acid, undecylenic acid, petroselinic acid, petroselaidic acid, elaidic acid, vaccenic acid, eurcic acid, brassidic acid, linolelaidic acid, linolenic acid, elaidolinolenic acid, pseudoeleostearic acid, eleostearic acid, punicic acid, arrachidonic acid, hiragonic acid, lauroleic acid, octadecadienoic acid, octadecatrienoic acid, noroctic acid, eicosadienoic acid, eicostrienoic acid, eicostatetraenoic acid, eicosapentaenoic acid, cetoleic acid, dicosadienoic acid, clupanodonic acid, docosahexaenoic acid, selacholeic acid, nisinic acid, and the like. It is impossible to list comprehensively all of the myriad acids which are operative, but all of the acids falling within the definition given herein are contemplated.

Although the invention has been described in considerable detail in the foregoing, it is to be understood that such detail is solely for the purposes of illustration and that variations may be made by those skilled in the art without departing from the spirit and scope of the invention except as set forth in the claims.

What is claimed is:

1. A polyurethane plastic prepared from a polyurethane reaction mixture comprising an organic polyisocyanate, an organic compound containing at least two active hydrogen containing groups as determined by the Zerewitinoff method, and a mixture of polymerized fatty acids which is obtained by the dimerization of unsaturated fatty acids to yield a composition having an acid number of about 160 mg./KOH/gram, an equivalent weight of about 352, a viscosity of about 6,000 cps, at 26° C., a monomer acid content of about 10% to about 20%, a dimer acid content of about 40% to about 50% and a trimer acid content of about 35% to about 45%.

2. The polyurethane plastic of claim 1 wherein the concentration of the polymerized fatty acids is from about 1 to about 50% by weight of the reaction mixture.

3. The polyurethane polymer of claim 1 prepared from a reaction mixture which comprises at least about 1 percent by weight based on the weight of the reaction mixture of a mixture of polymerized fatty acids obtained by the dimerization of unsaturated fatty acids.

4. The polyurethane polymer of claim 3 wherein the reaction mixture contains a blowing agent.

5. The polyurethane polymer of claim 3 wherein the reaction mixture contains a silicone oil having the formula:

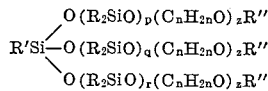

wherein R, R' and R" are alkyl radicals having 1 to 4 carbon atoms; $p$, $q$ and $r$ each have a value of from 4 to 8 and $(C_nH_{2n}O)_z$ is a mixed polyoxethylene oxypropylene group containing from 15 to 19 oxyethylene units and from 11 to 15 oxypropylene units with $z$ equal to from about 26 to about 34.

6. The polyurethane polymer of claim 5 wherein the silicone oil has the formula

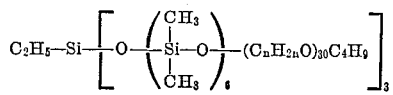

wherein $(C_nH_{2n}O)$ is a mixed polyoxyethylene and oxypropylene block copolymer container about 17 oxyethylene units and about 13 oxypropylene units.

7. The polyurethane polymer of claim 3 wherein the reaction mixture contains a catalyst selected from the group consisting of tertiary amines and tin compounds.

8. The polyurethane polymer of claim 3 wherein the organic polyisocyanate is tolylene diisocyanate.

9. The polyurethane polymer of claim 1 wherein the mixture of polymerized fatty acids is prepared by the dimerization of linoleic acid.

References Cited

UNITED STATES PATENTS 3,109,824  11/1963  Heiss _____ 260—18 XR

OTHER REFERENCES

Rowe, Paint Technology, 23, pp. 252–263, (1962).

Markley, Fatty Acids, Interscience, N.Y. (1960–1961), pp. 1036–1054.

Byrne (I), Offic. Dig. Federation Socs. Paint Tech (J. Paint Tech), vol. 34, 1962, pp. 234–243.

Byrne (II), Chem. & Ind, Apr. 15, 1961, pp. 457 & 458.

Moore, Paint, Oil, and Chem. Rev., vol. 114, Nov. 1, 1951, pp. 13, 14, 16, 26, 28, and 29.

DONALD E. CZAJA, Primary Examiner

M. J. WELSH, Assistant Examiner

U.S. Cl. X.R.

260—18, 75, 77.5